United States Patent

Stuart

[11] 4,118,320
[45] Oct. 3, 1978

[54] METHOD AND APPARATUS FOR AGITATING AND SCRUBBING FILTER BED

[76] Inventor: Fred E. Stuart, 1157 Bel Aire Dr., Daytona Beach, Fla. 32020

[21] Appl. No.: 817,234

[22] Filed: Jul. 20, 1977

[51] Int. Cl.² ............................................. B01D 23/24
[52] U.S. Cl. ....................................... 210/80; 210/82; 210/274; 210/276; 210/280
[58] Field of Search ......................... 210/80, 272–274, 210/276, 280, 81, 82

[56] References Cited

U.S. PATENT DOCUMENTS

| | | | |
|---|---|---|---|
| 2,309,916 | 2/1943 | Palmer | 210/80 |
| 3,412,863 | 11/1968 | Stuart, Sr. | 210/272 X |
| 3,587,975 | 6/1971 | Moffett | 210/272 X |
| 3,925,202 | 12/1975 | Hirs | 210/274 X |
| 3,932,278 | 1/1976 | Meidl et al. | 210/80 |

*Primary Examiner*—William A. Cuchlinski, Jr.
*Attorney, Agent, or Firm*—Albert L. Jeffers; John F. Hoffman

[57] ABSTRACT

A method and apparatus for agitating and scrubbing a filter bed in which a tubular arm is disposed in the bed near the top thereof and is adapted for rotation on a vertical central axis. The arm has nozzles extending from opposite sides thereon on respective sides of the center and is caused to rotate in the filter bed by the supply of air under pressure through the arm to the nozzles. Other nozzles can be mounted on the ends of the arm to treat the filter bed outwardly from the ends of the arm. The air supplied to the nozzles may be enriched with oxygen. The filter bed is preferably backwashed by upward flow of water therethrough simultaneously with the agitation and scrubbing of the upper portion thereof with the air jets.

1 Claim, 2 Drawing Figures

METHOD AND APPARATUS FOR AGITATING AND SCRUBBING FILTER BED

The present invention relates to a method and apparatus for agitating and scrubbing filter beds. The present invention is particularly concerned with improvements with filtering systems of the type in which water is filtered after chemical treatment thereof to remove flocculating agents and the like from the water.

A common type of filter system with which the present invention is adapted for use comprises means for supporting a filter bed which may consist of particulate material ranging from relatively fine at the top of the bed to relatively coarse at the bottom of the bed. Sand, for example, and gravel form suitable material for making such a filter bed.

In operation, water is supplied to the top of the filter bed and flows downwardly therethrough and most of the material which it is desired to remove from the water is taken out by the upper few inches of the filtering material. When the filter bed begins to lose efficiency, the flow of water to be filtered therethrough is interrupted and, instead, water is supplied to the bottom of the filter bed and moves upwardly therethrough to wash the filtered out material from the bed.

At this time, agitation of the upper portion of the bed, which contains most of the filtered out material, is desirable. Heretofore, this has been accomplished by supplyng water through a tubular agitator element supported in a horizontal position beneath the top of the filter bed and arranged for rotation on a vertical central axis. The tubular member has nozzles extending laterally therefrom and when supplied with water under pressure will supply jets of water to the filter bed to thereby enhance the agitation of the filter bed and the removal of the filtered out material therefrom.

In my earlier U.S. Pat. Nos. 3,216,575, 3,412,863, 3,434,600 and 3,557,961, I show arrangements wherein the horizontal tubular member is supplied with water under pressure and has nozzles distributed therealong on opposite sides so that the rotary bar is caused to rotation by the supply of water to the jets.

The present invention is concerned with an arrangement of the nature referred to with which air, or air having oxygen added thereto, is supplied through the agitator pipe and the nozzles thereon to the filter bed. The air supplied will not only effect the desired agitation of the filter medium and the scrubbing thereof but will also, in particular, provide for a supply of oxygen which will assist in destroying unwanted microorganisms.

It has been found that a supply of air under sufficient pressure will cause rotation of the tubular arm and adequate agitation of the filter media with the added beneficial effect of oxygen supply to the filter media. It is also contemplated to rotate the arm independently of the supply of air to the nozzles so that smaller amounts of air, especially when the air is enriched with oxygen, can be employed and the air jets will be distributed throughout the upper level of the filter bed.

BRIEF SUMMARY OF THE INVENTION

According to the present invention, a filter bed is formed by depositing layers of particulate material, such as gravel with sand thereon, on a foraminous support so that water supplied to the sand will flow downwardly through the sand and the gravel and the foraminous support to a receiving channel. The material which is to be removed from the water being filtered, usually, a flocculating agent, and the material entrapped therein during chemical treatment of the water, is normally captured by about the upper four inches of the sand layer.

When the filter begins to lose efficiency, it is backwashed by supplying water to the underneath side of the foraminous support so that it flows upwardly through the filter bed and backwashes the entire portion of the filter bed, including the upper portion containing the captured flocculating agent.

According to the present invention, a horizontal tubular agitator is rotatably supported on a vertical axis near the upper portion of the filter bed and is supplied with air under pressure which issues from the pipe in the form of jets directed in respective horizontal directions on opposite sides of the center of the pipe. The pipe is either rotated by the jets or by another instrumentality and the jets of air scour and scrub the filter media as well as supplying oxygen thereto. The present invention contemplates supplying further oxygen to the air under extreme conditions.

The exact nature of the present invention will become more clearly apparent upon reference to the following detailed specification taken in connection with the accompanying drawings in which.

DETAILED DESCRIPTION OF THE INVENTION

Figure 1:
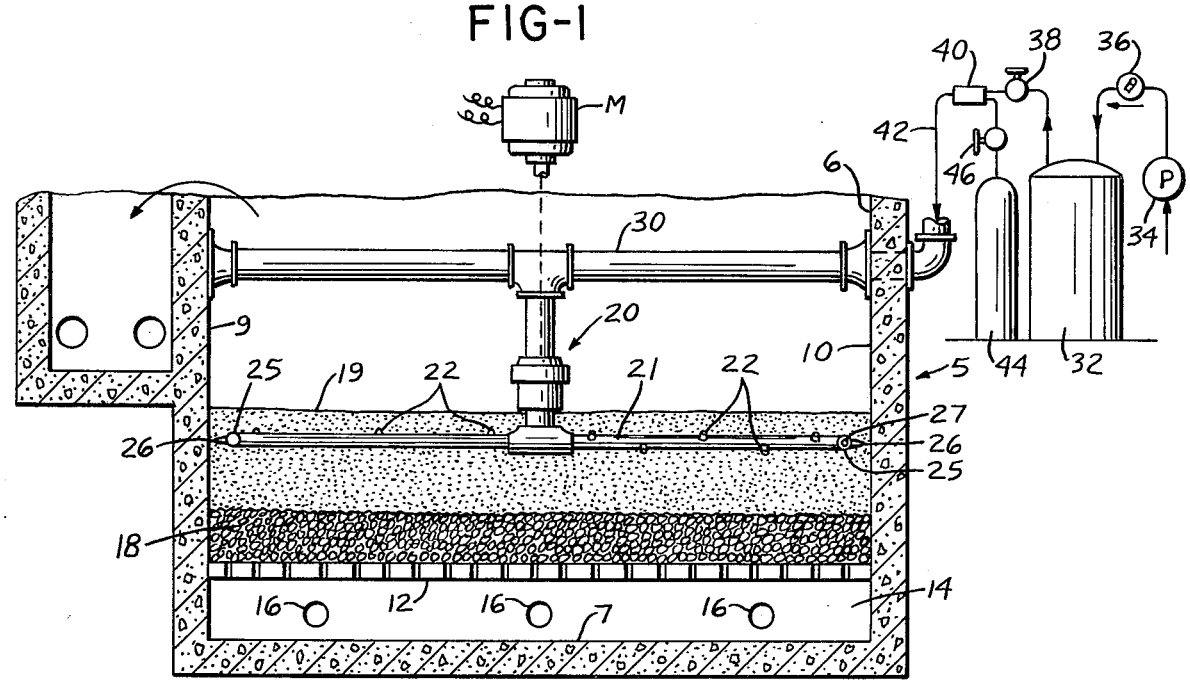
FIG. 1 is a schematic view showing an installation according to the present invention with means for supplying air to the rotating jet pipe near the top of the filter bed.

Referring to the drawings somewhat more in detail, reference character 5 designates a filter bed of any desired size and dimensions and which may constitute one or more filter bed units of a water filtration plant. The filter bed 5, as illustrated in FIG. 1, comprises a concrete tank 6 having a bottom wall 7 and side walls 9 and 10. Intermediate the top and bottom wall of the tank is a perforated wall 12 extending between the side walls 9 and 10 and defining a well 14 therebeneath for filtered water. Conduits 16 communicate with the well 14 for drawing off filtered water which has passed through the filter bed. The filter medium of the filter bed consists of coarse gravel 18 and an upper layer 19 consisting of fine particles such as sand or the like as aforementioned.

Figure 2:
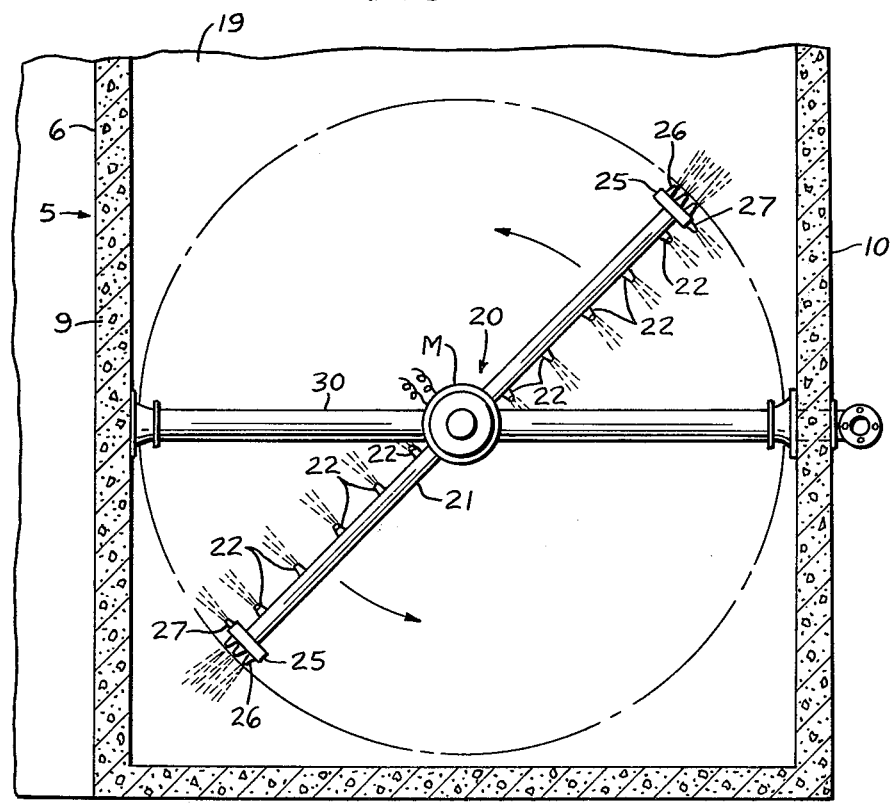
FIG. 2 is a plan view showing a typical rotating jet pipe.

Mounted for rotation in the filter bed 5 is a revolvable agitator arm means or unit, generally designated 20. The agitator arm means 20 illustrated in FIG. 2 consists of an inverted T structure, as shown, and comprising an elongated pipe 21 equipped with nozzles, generally designated 22. The nozzles preferably are threaded into the pipe 21 and may be of different sizes as may be desired. At opposite ends of the pipe 21 is a fitting 25 having four nozzles. Three nozzles 26, as illustrated in FIG. 2, are arranged to deliver jets laterally and outwardly from the opposite ends of the agitator arm. A nozzle 27 attached to the fitting is arranged to deliver a jet stream in the same general direction as the adjacent nozzle on the pipe 21.

To cause the agitator arm 20 to revolve counterclockwise, as illustrated by the arrows in FIG. 2, the nozzles along one radius of the arm are arranged to deliver jets in one direction while along the opposite radius of the agitator arm the nozzles are arranged to discharge jets in the opposite direction. The reaction forces thus add together to cause the agitator arm to revolve about a central vertical axis as shown in FIG. 2.

The agitator arm 20 is rotatably supported on a pipe 30, one end of which is connected with a compressed air container 32 adapted for being maintained at a predetermined pressure by an air pump 34 connected through a check value 36 with the tank.

A valve 38 is interposed between tank 32 and pipe 30 so that air is supplied to the pipe 30 and therethrough to agitator arm 20 as desired. A mixing station 40 is provided in conduit 42 leading from tank 32 to pipe 30 and forms a region in which oxygen from an oxygen tank 44 can be admixed with air flowing from tank 32 along conduit 42 into pipe 30. A control valve 46 controls the supply of oxygen to the mixing station 40.

In the normal course of events, a sufficient supply of air to pipe 30 will cause the tubular agitator arm to rotate in the filter thereby to supply jets of air throughout the upper region of the filter bed thereby to scour and oxygenate the portion of the filter bed which is most effective for removing material from the water being filtered. The filter bed is, at that time, backwashed with an upward flow of water therethrough so that the material loosened from the upper region of the filter bed is washed therefrom to an overflow region.

Under circumstances in which it may be desired to increase the amount of oxygen being supplied to the filter bed, while decreasing the amount of air, a motor M may be provided which can be energized to cause rotation of the tubular agitator arm independently of the supply of air thereto.

As mentioned in the above identified U.S. Pat. No. 3,412,863, a suitable speed of rotation of the agitator arm is from about four to about seven revolutions per minute while the jets issuing from the nozzles along the arm move at relatively high speed of up to about 75 miles per hour.

The patent mentions that water under pressure of from 40 to about 125 pounds per square inch can be employed for actuating the agitator arm and supplying the wash water to the nozzles mounted on the arm and it has been found that air supplied within this pressure range will also produce satisfactory results although a preferred air pressure is within a range of about 90 to 100 pounds per square inch.

As will be seen in the drawings, the nozzles 22 mounted on the pipe 21 may include nozzles directed slightly upwardly and slightly downwardly from the horizontal. At least downwardly extending nozzles are contemplated within the purview of the present invention because such nozzles will give added depth of penetration to the air jets emerging from the nozzles.

The group of nozzles 26 on the ends of pipe 21 may also include a downwardly directed nozzle if so desired. The fitting at the outer end of the pipe 21 carrying nozzles 26 may also carry a further nozzle 27 directed rearwardly in respect of pipe 21 so as to assist in the rotation of the pipe.

Modifications may be made within the scope of the appended claims.

What is claimed is:

1. An agitator mechanism for washing and cleaning the filter medium of a filter bed comprising:
 a tubular agitator arm horizontally disposed near but beneath the top of the filter bed and rotatable on a vertical axis near the longitudinally central region of the arm,
 nozzle means distributed along said arm including nozzles directed to respective sides of the arm on respective sides of said axis,
 means for supplying air under pressure to said arm and therethrough to said nozzle means to scrub the filter bed medium in the region of said arm by the air jets emerging from said nozzle means,
 means for supplying oxygen to the air flowing to said nozzle means so as to enrich the air with added oxygen,
 motor means for rotating said arm independently of the air jets emerging from said nozzle means, and
 means for supplying wash water to the filter bed at the bottom for upward flow through the filter bed.

* * * * *